US008600997B2

(12) United States Patent
Eiron et al.

(10) Patent No.: US 8,600,997 B2
(45) Date of Patent: Dec. 3, 2013

(54) METHOD AND FRAMEWORK TO SUPPORT INDEXING AND SEARCHING TAXONOMIES IN LARGE SCALE FULL TEXT INDEXES

(75) Inventors: Nadav Eiron, San Jose, CA (US);
Daniel N. Meredith, Sunnyvale, CA (US); Joerg Meyer, San Jose, CA (US);
Jan H. Pieper, San Jose, CA (US);
Andrew S. Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2343 days.

(21) Appl. No.: 11/241,687

(22) Filed: Sep. 30, 2005

(65) Prior Publication Data
US 2007/0078880 A1  Apr. 5, 2007

(51) Int. Cl.
*G06F 7/00* (2006.01)
*G06F 17/30* (2006.01)

(52) U.S. Cl.
USPC .......................................................... 707/741

(58) Field of Classification Search
None
See application file for complete search history.

(56) References Cited

U.S. PATENT DOCUMENTS

| 4,606,002 | A | | 8/1986 | Waisman et al. |
| 5,701,469 | A | * | 12/1997 | Brandli et al. ................. 707/102 |
| 5,848,410 | A | | 12/1998 | Walls et al. |
| 6,192,374 | B1 | | 2/2001 | Lawrence |
| 6,349,308 | B1 | * | 2/2002 | Whang et al. ............. 707/103 Z |
| 6,446,066 | B1 | | 9/2002 | Horowitz |
| 6,457,018 | B1 | | 9/2002 | Rubin |
| 6,643,639 | B2 | | 11/2003 | Biebesheimer et al. |
| 6,732,087 | B1 | | 5/2004 | Hughes et al. |
| 7,149,748 | B1 | * | 12/2006 | Stephan ........................ 707/102 |
| 2003/0126561 | A1 | * | 7/2003 | Woehler et al. ............... 715/531 |
| 2003/0131000 | A1 | | 7/2003 | Bates et al. |
| 2004/0267722 | A1 | | 12/2004 | Larimore et al. |
| 2005/0144159 | A1 | * | 6/2005 | Baader et al. ...................... 707/3 |
| 2006/0004747 | A1 | * | 1/2006 | Weare .............................. 707/5 |

FOREIGN PATENT DOCUMENTS

| JP | 7249045 A | 9/1995 |
| JP | 8115340 A | 5/1996 |
| JP | 8249354 A | 9/1996 |
| JP | 2001043236 A | 2/2001 |

* cited by examiner

*Primary Examiner* — Robert Beausoliel, Jr.
*Assistant Examiner* — Michael Pham
(74) *Attorney, Agent, or Firm* — Gibb & Riley, LLC

(57) ABSTRACT

A system and method of indexing a plurality of entities located in a taxonomy, the entities comprising sets of terms, comprises receiving terms in an index structure; building a posting list for an entity with respect to the locations of the set of terms defining the entity and data associated with the respective terms; and indexing a name of a group comprising the entities within this group at the location of the entities with the data of the group comprising the name of the respective entity at each location. The building of the posting list comprises storing the location of the term and data associated with the term in an entry in the posting list for the term. The method comprises indexing aliases of the name of the group comprising the term, and using an inverted list index to associate data with each occurrence of an index term.

9 Claims, 4 Drawing Sheets

METHOD AND FRAMEWORK TO SUPPORT INDEXING AND SEARCHING TAXONOMIES IN LARGE SCALE FULL TEXT INDEXES

BACKGROUND

1. Field of the Invention

The embodiments of the invention generally relate to information retrieval systems, and, more particularly to techniques for data searching in full text inverted list information retrieval systems.

2. Description of the Related Art

A taxonomy is a classification of things. For example, the well-known directory structure in most operating systems is a method to organize individual files into groups. In a full text index, the indexing takes advantage of the fact that many documents share identical tokens (e.g., words or characters). An inverted list index generally only stores each unique token once while the token may occur several times in the original set of documents. Therefore, an inverted list index can generally be seen as a form of compressing the set of documents. Typically, the compression ratio depends on the scope of the index. Generally, a basic inverted index simply records whether a term occurs within a document, but not how many times or where it occurs. A full inverted index typically records every occurrence of every token within every document. While a basic inverted index is more compact in terms of storage, it generally cannot support searches for sequences of tokens, or the existence of tokens within a certain window of tokens. However, a full inverted index generally allows such sophisticated searches. Between, a basic inverted index and a full inverted index, there are various levels of information that can be stored within an inverted list for a term.

With respect to inverted lists, one of the most well-known forms of an index is an index in a book. Almost every book has a generally alphabetical listing of words or sequences of words (e.g., section and chapter headers) at the end of the book, along with page numbers where they are discussed. Using an index, one can avoid doing a page-by-page scan to find pages that contain certain words. Similarly, an inverted list index in the context of information retrieval applications such as web search engines does exactly that. Abstractly, the web can be analogized as a book, and individual web documents represent the pages in the book. Building an inverted list index is performed by scanning all documents to be indexed and splitting them into tokens. This process, called parsing or tokenization, produces tokens that can be words on an English text document, Chinese characters, 4 byte numbers, etc.

A query against a full text index is the same as the intersection/join (depends on query operators, e.g., OR, AND), of the inverted lists of all the query terms. The query result is therefore an inverted list itself. For each term of the query, an inverted list generally has to be accessed. The process of data mining involves extracting information such as patterns, relationships, etc. from a large corpus of data. Data miners (so-called annotators) typically operate on the corpus, usually document-by-document, and add metadata to the corpus. An entity can be understood as something that one refers to with many names or descriptions. An entity can be a person, an institution, an organization, a building or a country. All of these have in common the notion that the same thing can be described in different languages, with different names or nicknames or varying short forms of their names. Therefore, an entity can also be generally expressed as a search query.

The above concepts allow users to search for bags of words or mined entities. However, often times this is not sufficient. Computer users typically have the tendency to organize and group things together. Examples are file systems which use directories to group related files or mailing lists which group email addresses together. The basic idea is that an operation can be performed on a group of things by referring to a single alias (i.e., the directory name or the name of the mailing list).

In a search application, a similar functionality is desirable. Instead of searching for documents that contain a group of specific terms; it is generally more efficient to index and search for the group using an alias. For example, all occurrences of politicians' names in documents may be grouped using a single term "politicians". That way, one can efficiently search a corpus of documents without having to list all politicians individually. When searching for a group of things, it is generally not only useful to find documents that match the group; it is also useful to know which entity is "hidden" behind an occurrence of the group name.

A first conventional solution to this problem is to query for a group such as "politicians" by querying individually for each politician in the group. However, this is generally unacceptable since the group may contain thousands, millions, or in some cases hundreds of millions of entries (for example, the group of all people's names), and the processing time in such a case can move from fractions of a second to days.

A second conventional solution is to create a new token corresponding to the group. However, this solution generally fails to provide important functionality. The user knows that documents in the result set reference a politician, but does not know which politician. For certain analytic applications, this approach is also unacceptable. Relational databases are well-established tools for storing relational data. The containment of an entity in a group is a relation as well. However, relational databases are generally not suitable for building large scale text indices. Accordingly, there remains a need for a novel indexing technique that is capable of finding documents that contain entities that belong to the group and to find out which entity is "hidden" behind an occurrence of the group name

SUMMARY

In view of the foregoing, an embodiment of the invention provides a method of indexing a plurality of entities located in a taxonomy, the entities comprising sets of terms, and in another embodiment, a program storage device readable by computer, tangibly embodying a program of instructions executable by the computer to perform a method of indexing a plurality of entities located in a taxonomy, wherein the method comprises receiving terms in an index structure; building a posting list for an entity with respect to the locations of the terms and data associated with the terms received from the index structure; and indexing a name of a group at the location of the entity with the data of the group comprising the name of the entity. Preferably, the building of the posting list comprises storing the location of the entity and data associated with the entity in an entry in the posting list for the group. Moreover, the method may further comprise using an inverted list index to associate data with each occurrence of an index term, and searching the inverted list index to allow statistical aggregation across a set of document hits, wherein the statistical aggregation indicates which individual entities exist in the document set. Additionally, the method may further comprise extracting datafields of all occurrences of a term with each document found by an indexer.

Another aspect of the invention provides a system of indexing a plurality of entities located in a taxonomy, the entities comprising sets of terms, wherein the system comprises an index structure adapted to receive terms; and their respective postings lists comprising locations of the term and data associated with each location, wherein the index structure comprises a name of a group and its respective postings list comprising the locations of all entities within the group with each datafield comprising the name of the respective entity at each location. Preferably, the posting list is adapted to store the location of the term and data associated with the term in an entry in the posting list for the term. The system may further comprise an inverted list index structure adapted to associate data with each occurrence of an index term. Additionally, the system may further comprise a query mechanism adapted to search the inverted list index structure to allow statistical aggregation across a set of document hits, wherein the statistical aggregation indicates which individual entities exist in the document set. Also, the system may further comprise an indexer adapted to extract datafields of all occurrences of a term with each document found by the indexer.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
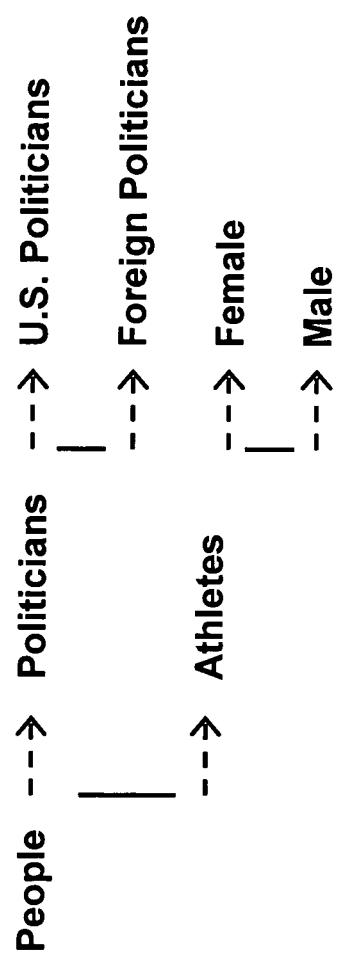
FIG. 1 illustrates a schematic diagram of a taxonomy sequence.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a novel indexing technique that is capable of finding documents that contain entities that belong to the group and to find out which entity is "hidden" behind an occurrence of the group name. The embodiments of the invention achieve this by providing a method and framework to support indexing and searching taxonomies in large scale full text indexes. More specifically, the embodiments of the invention provide a technique for indexing a collection comprising a plurality of members in which the index provides a data structure allowing sequential access to the documents referencing a member of the collection, wherein this data structure is augmented with information to determine which particular member has been referenced. Referring now to the drawings, and more particularly to FIGS. 1 through 4, there are shown preferred embodiments of the invention.

Figure 2:
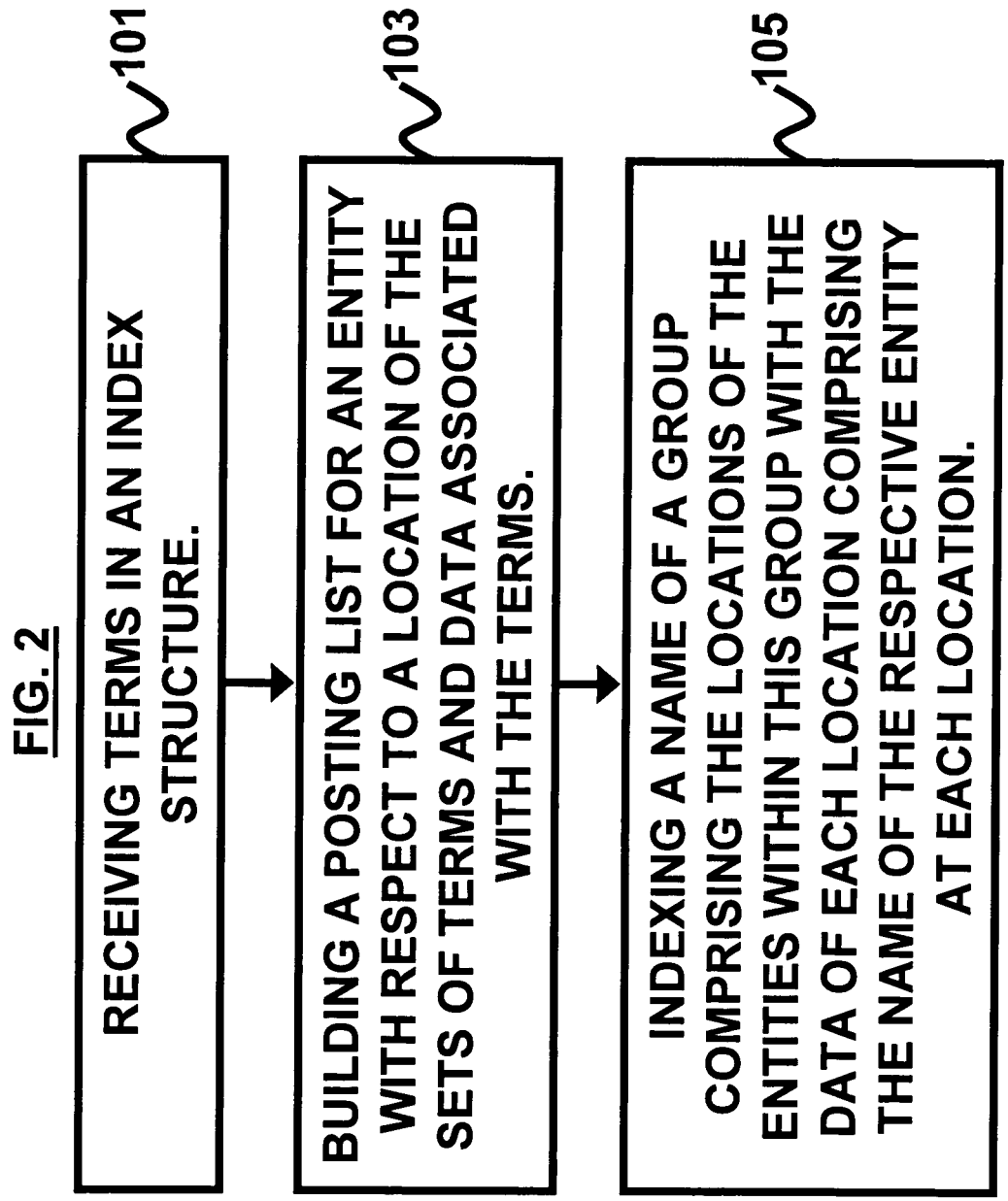
FIG. 2 illustrating a preferred method of an embodiment of the invention.

FIG. 2 illustrates a flow diagram of a method of indexing a plurality of entities located in a taxonomy, the entities comprising of sets of terms, wherein the method comprises receiving (101) terms in an index structure; building (103) a posting list for an entity with respect to the locations of the sets of terms and data associated with the terms; and indexing (105) a name of a group comprising the locations of the entities within this group with the data of each location comprising the name of the respective entity at each location. Preferably, the building (103) of the posting list comprises storing the location of the term and data associated with the term in an entry in the posting list for the term. Moreover, the method may further comprise using an inverted list index to associate data with each occurrence of an index term, and searching the inverted list index to allow statistical aggregation across a set of document hits, wherein the statistical aggregation indicates which individual entities exist in the document set. Additionally, the method may further comprise extracting datafields of all occurrences of a term with each document found by an indexer.

Generally, the embodiments of the invention provide an index building process that allows for the roll-up of taxonomies; i.e., when indexing a particular entity on some location in a document, all the groups containing this entity directly or indirectly (through sub-groups) are indexed as well, using the name of the group as an index term. Next, the embodiments of the invention present an inverted list index format that allows the association of data with each occurrence of an index term. Thereafter, as further described below, the embodiments of the invention provide a method of searching the inverted lists to allow statistical aggregation across a set of document hits and provide a user with information on which individual entities existed on that page.

Entities are defined in a taxonomy; i.e. an entity is a description of what sequences of text represent an occurrence of such entity. A simple taxonomy is illustrated in FIG. 1. Individual entities can be grouped, and groups can be grouped further, analogous to the concept of directories in file systems. Tree-like document structures such as eXtensible Markup Language (XML) allow for the representation of a taxonomy. When indexing an occurrence of an entity, the term representing the entity (alias), as well as all aliases of the groups containing the entity, each group alias occurrence is associated with the name of the actual entity. Searching for documents can use arbitrary combinations of words, entity aliases or entity group aliases. Moreover, search results can be annotated using the associated data of group aliases by returning the entity name with the occurrence information of the group alias. This is a function of the underlying index. The embodiments of the invention support applications that provide statistical information about a group of document hits using the associated data of group terms. The ability to return data with group aliases can be used to aggregate information and collect statistics based on a set of document hits. For example, looking for documents that contain any person (using the group alias for person), one can choose to have all individual persons returned with the documents (from the datafields of the occurrences of "person". The application can then use this data and aggregate on this and display the n most frequent individual persons.

Furthermore, the embodiments of the invention provide the ability to use a group alias to fundamentally search for a collection of terms simplifies query construction, reduces query length and the number of terms within the query. Allowing the use of group aliases relieves the user from having to know all entries within a group in order to search for all entries in a group. Generally, each individual term in a query requires a term-lookup and potentially a disk-seek. In this context, when doing a query with multiple terms (e.g., words), a "term-lookup" is the process of finding out whether the term exists in the index at all; i.e. whether any indexed documents contains the given term at least once. The term "disk-seek" refers to any operation that is performed on secondary storage devices, such as hard disk. In this context, a disk seek is necessary when a term and its inverted list have never been seen before and need to be loaded from disk. The reduction of disk-seeks is one of the primary goals in doing search through large corpora, because the speed difference between a CPU and internal memory (RAM) and external memory such as a hard disk are multiple orders of magnitude. By reducing the number of term lookups and disk seeks, input/output (I/O) operations are more sequential which has a positive effect on run-time performance.

According to the embodiments of the invention query-reuse is simplified because growing collections are automatically handled. In other words, an update to the taxonomy; i.e., adding a new person to the group of persons, is picked up in the next index build. If a member is added to a group, it is automatically indexed as part of the group and will be picked up with an index update. Therefore, queries using group aliases need not be changed in the event of a change in group membership. Furthermore, according to the embodiments of the invention, storing data with each posting allows for index-only data analysis on result sets returned by a query. If one only knew that a person existed on a page and where (word or byte offset), one would have to load all the documents satisfying a query and extract the information from the pages, to get to the actual names. Making the data available through the index is advantageous for runtime performance. With an index built using the embodiments of the invention, all occurrences of any entity in a taxonomy can be returned for any of the documents matching the query accessing just one postings list. This can be accomplished because the inverted list for a group includes all occurrences of its children. This allows for index-only data retrieval, which, in conventional solutions, usually require an external data store containing metadata of a document. As previously mentioned, the conventional solutions of retrieving the documents, parsing them, and extracting the data are prohibitive in terms of runtime. The benefit afforded by the embodiments of the invention is a reduction in network or disk roundtrips.

Generally, the embodiments of the invention function as follows. First, an index build process occurs. Here, the index process retrieves terms (words, entity aliases, etc.). The index is preferably embodied as a set of files that are stored on a secondary storage medium, such as hard drives. Each occurrence of a term can have data associated with it. Postings lists are built for each unique term. The format of a posting is [location|data]. For terms in taxonomy, the build process does the following: (1) insert the entity leaf using the location x in the document at which it occurred; (2) for each group containing that entity (directly or indirectly), the embodiments of the invention index the name of the group at the same location x and place the name the entity alias in the datafield. For example, suppose there are two entities, John Kerry and George Bush, which is in the group of U.S. politicians which is contained in the group people. Suppose, the entity John Kerry occurs in some document at location x and the entity George Bush in some document at location y. The index build process produces three postings lists for the three aliases (one for the entity and two for the group names) as indicated in Table 1:

TABLE 1

Posting Lists

| Term Name | Postings List |
|---|---|
| People/U.S.Politicians/GeorgeBush | ...] [y|no data] [... |
| People/U.S.Politicians/JohnKerry | ...] [x|no data] [... |
| People/U.S.Politicians | ...] [x|JohnKerry] [y|GeorgeBush] [... |
| People | ...] [x|U.S.Politicians/JohnKerry] [y| U.S.Policiticians/GeorgeBush] [... |

The next step of the process involves a query process. Here, an index built using the method as described above can then be used to search for documents containing occurrences of any group member. Searching is facilitated through a search engine which uses an index to look up terms and access the inverted lists of such terms. The query engine steps through all occurrences of a postings list. The index comprises a set of files including all terms and their respective postings lists, the search engine determines whether a term exists and then uses the information in the index files to find the inverted lists (postings) for that term. The postings are loaded from the disk using conventional file access methods as used in any operating system. The postings lists for entities within a taxonomy are treated as ordinary index terms and can be combined with regular index terms, such as words on the page. Next, extraction of data fields of query terms occurs. Here, when processing a query looking for documents containing a set of terms, the indexer returns all occurrence information of a term with each document it finds. Being able to step through the postings for each query term, the search engine returns the information from each posting, which is the position within the document as well as associated data. This is accomplished by extracting all datafields of all occurrences that fall within the document.

Figure 3:
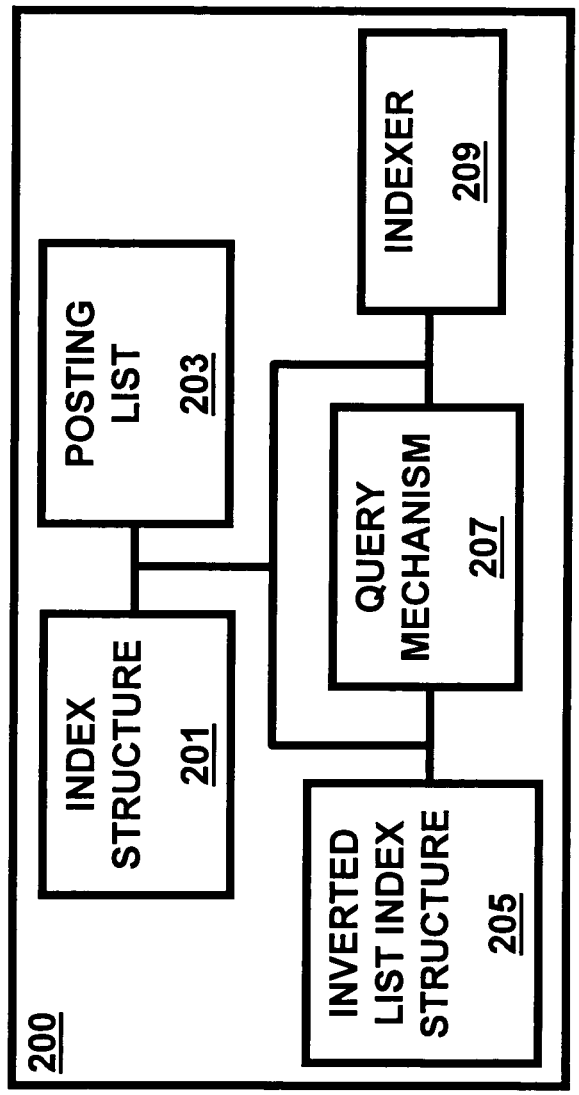
FIG. 3 is a system diagram according to an embodiment of the invention.

FIG. 3 illustrates a system diagram according to an embodiment of the invention. The system 200 of indexing a plurality of entities comprising sets of terms located in a taxonomy comprises an index structure 201 adapted to receive terms; and postings lists 203 comprising locations of the terms and data associated with each location of the terms; wherein the index structure 201 comprises a name of a group and its postings lists 203 comprising the locations of all entities within the group and each datafields including the respective entity name at each location. Preferably, the posting list 203 is adapted to store the location of the term and data associated with the term in an entry in the posting list 203 for the term. The system 200 may further comprise an inverted list index structure 205 adapted to associate data with each occurrence of an index term. Additionally, the system 200 may further comprise a query mechanism 207 adapted to search the inverted list index structure 205 to allow statistical aggregation across a set of document hits, wherein the statistical aggregation indicates which individual entities exist in the document set. Also, the system 200 may further comprise an indexer 209 adapted to extract datafields of all occurrences of a term with each document found by the indexer 209.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
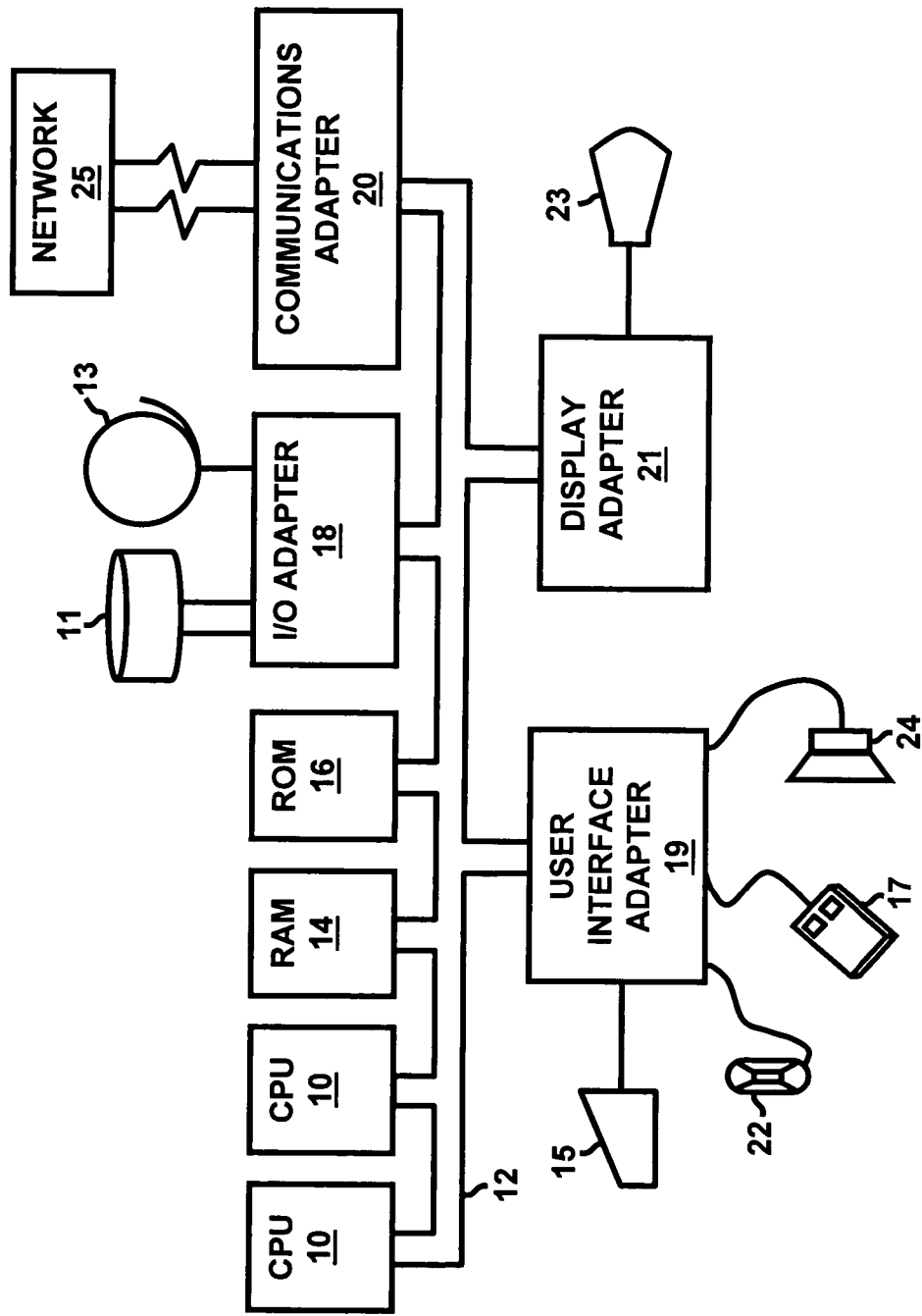
FIG. 4 is a computer architecture diagram according to an embodiment of the invention.

A representative hardware environment for practicing the embodiments of the invention is depicted in FIG. 4. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of indexing entities, located in a taxonomy, said method comprising:
retrieving said entities from documents, each of said entities being indexed by an entity alias and belonging to a group located by said taxonomy and indexed by a group name;
building posting lists for all occurrences of each of said entities, each said posting list of the posting lists for all occurrences of said entities comprising a first data field, including a location in said documents for an occurrence of an entity of said entities, and a second data field, including a set of terms and data corresponding to said occurrence of said entity;
building a posting list for said group of said all occurrences of each of said entities, said posting list for said group comprising a first data field, including a location in said documents for an occurrence of an entity of said entities, and a second data field comprising an entity alias corresponding to said occurrence for said entity;
indexing, by said group name, said posting list for said group; and
outputting said posting list for said group in response to a query using said group name.

2. The method of claim 1, further comprising using an inverted list index to associate data with each occurrence of each of said entities.

3. The method of claim 2, further comprising searching said inverted list index to allow statistical aggregation of associated data across a set of document hits, wherein said statistical aggregation indicates which individual entities exist in a document set.

4. A non-transitory program storage device readable by computer, tangibly embodying a program of instructions executable by said computer to perform a method of indexing entities, located in a taxonomy, said method comprising:
retrieving said entities from documents, each of said entities being indexed by an entity alias and belonging to a group located by said taxonomy and indexed by a group name;
building posting lists for all occurrences of each of said entities, each said posting list of the posting lists for all occurrences of each of said entities comprising a first data field, including a location in said documents for an occurrence of an entity of said entities, and a second data field, including a set of terms and data corresponding to said occurrence of said entity;
building a posting list for said group of said all occurrences of each of said entities, said posting list for said group comprising a first data field, including a location in said documents for an occurrence of an entity of said entities, and a second data field comprising an entity alias corresponding to said occurrence for said entity;

indexing, by said group name, said posting list for said group; and outputting said posting list for said group in response to a query using said group name.

5. The non-transitory program storage device of claim 4, wherein said method further comprises using an inverted list index to associate data with each occurrence of each of said entities.

6. The non-transitory program storage device of claim 5, wherein said method further comprises searching said inverted list index to allow statistical aggregation of associated data across a set of document hits, wherein said statistical aggregation indicates which individual entities exist in a document set.

7. A system of indexing entities, located in a taxonomy, said system comprising:

a memory storing an index structure configured to retrieve said entities from documents, each of said entities being indexed by an entity alias and belonging to a group located by said taxonomy and indexed by a group name; and a processor configured to:

build posting lists for all occurrences of each of said entities, each said posting list of the posting lists for all occurrences of each of said entities comprising a first data field, including a location in said documents for an occurrence of an entity of said entities, and a second data field, including a set of terms and data corresponding to said occurrence of said entity;

build a posting list for said group of said all occurrences of each of said entities, said posting list for said group comprising a first data field, including a location in said documents for an occurrence of an entity of said entities, and a second data field comprising an entity alias corresponding to said occurrence for said entity;

index, by said group name, said posting list for said group; and output said posting list for said group in response to a query using said group name.

8. The system of claim 7, further comprising an inverted list index structure configured to associate data with each occurrence of each of said entities.

9. The system of claim 8, further comprising a query mechanism configured to search said inverted list index structure to allow statistical aggregation of associated data across a set of document hits, wherein said statistical aggregation indicates which individual entities exist in a document set.

* * * * *